United States Patent

Rouse

[15] 3,703,099
[45] Nov. 21, 1972

[54] PRESSURE TRANSDUCER

[72] Inventor: William Rouse, Macclesfield, England

[73] Assignee: Imperial Chemical Industries Limited, London, England

[22] Filed: Oct. 23, 1970

[21] Appl. No.: 83,524

[30] Foreign Application Priority Data

Nov. 12, 1969 Great Britain..........53,408/69

[52] U.S. Cl. ............73/398 AR, 73/409, 128/2.05 D
[51] Int. Cl. ................................................G01l 9/06
[58] Field of Search....73/398, 409, 406; 128/2.05 D, 128/2.05 E

[56] References Cited

UNITED STATES PATENTS 3,553,625  1/1971  Stedman.....................73/398

Primary Examiner—Donald O. Woodiel
Attorney—Cushman, Darby & Cushman

[57] ABSTRACT

A pressure transducer including a pressure sensitive device having at least one part sensitive to a difference in pressure on each side thereof, a detector for detecting flexural strain induced in the sensitive part, and a distensible envelope providing a closure for and located adjacent to and unsecured to said pressure sensitive device. Fluid, especially gas, pressure is supplied to the interior of the envelope via fluid access means to distend and isolate the pressure sensitive device and render it unresponsive to any external pressure thus enabling a "zero reading" to be determined by equalizing the pressure on each side of said pressure sensitive device.

6 Claims, 2 Drawing Figures

PRESSURE TRANSDUCER

This invention relates to a pressure transducer, that is a device for measuring an applied pressure in which the applied energy is converted by a pressure sensitive device into another form of energy whereby its precise magnitude can be appreciated by human senses. Usually, of course, the energy of the applied pressure is used to cause a change in electrical energy and this change is displayed in any conventional way. The present invention relates particularly to a pressure transducer which is used for measuring changes in the pressure of fluids located in relatively inaccessible places, for example changes in the pressure of body fluids inside man or an animal.

The measurement of pressure changes in body fluids inside man or an animal, for example changes in ventricular pressure, is of value in medical research and sometimes in clinical practice, and in making such measurements it is usual to insert a pressure sensitive device into the appropriate body organ. Changes in pressure are recorded with apparatus located outside the host and connected, for example electrically or by radio signal, to the pressure sensitive device. When such a device is used, changes in pressure are recorded faithfully, and their magnitude is known from a prior calibration of the device. However, there is always uncertainty as to the actual pressure being recorded since although the "zero pressure" reading (usually equivalent to atmospheric pressure) can be determined before the device is inserted into the animal, it has been found that this determination does not apply after insertion due, it is thought, to changes in temperature and other environmental factors.

It is an object of the present invention to provide a pressure transducer in which the "zero pressure" reading can be determined after the device has been inserted into the host.

Clearly a pressure transducer in which the "zero pressure" reading can be determined after the device has been inserted into a host can also be used to measure pressures in other relatively inaccessible places, for example inside pipes or pressure vessels used in some industrial processes. Accordingly, the present invention is not limited to a pressure transducer for use in measuring changes in pressure in body fluids, but includes pressure transducers for all purposes in which benefit from this invention can be derived.

According to the invention there is provided a pressure transducer which is provided with an envelope, at least part of which is distendable, and fluid access means communicating with the interior of the envelope whereby on supplying fluid to the device, the envelope is distended to render the pressure transducer unresponsive to any external pressure.

A particular form of the invention is a pressure transducer which comprises a pressure sensitive device comprising at least one part sensitive to a difference in pressure on each side of that part and a detector of the strain induced in such sensitive part, an envelope, at least part of which is distendable, providing a closure which enables a difference in pressure to exist on each side of the sensitive part, and fluid access means communicating with the interior of the envelope and with each side of the sensitive part whereby, on supplying fluid to the device, the envelope is distended to render the pressure sensitive device unresponsive to any external pressure and also the pressure on each side of the sensitive part is equalized.

Commonly, of course, the component of a pressure transducer which is sensitive to a difference in pressure on each side of that component is movable in response to the difference in pressure, and a detector of such movement is provided in the pressure sensitive device.

The invention is normally used in conjunction with a recorder on which the changes detected by the device may be displayed. Thus the term "detector" is used to mean the actual detecting part itself together with any necessary means for transmission of the changes detected to the recorder. Such means may be merely wires, or they could include a radio wave transmitter whereby changes can be monitored by radio-telemetry.

According to a further feature of the invention there is provided a method of determining the "zero pressure" reading of a pressure transducer provided with an envelope, at least part of which is distendable, and fluid access means, which method comprises the steps of passing a fluid through the fluid access means so that the envelope is distended and the pressure transducer is rendered unresponsive to any external pressure, and then reading the recorded pressure which represents the "zero pressure" reading.

In order that the invention may be more clearly understood, a preferred embodiment and a modification thereof of the pressure transducer will now be described by way of example only with reference to the accompanying drawings of which:

Figures 1, 2:
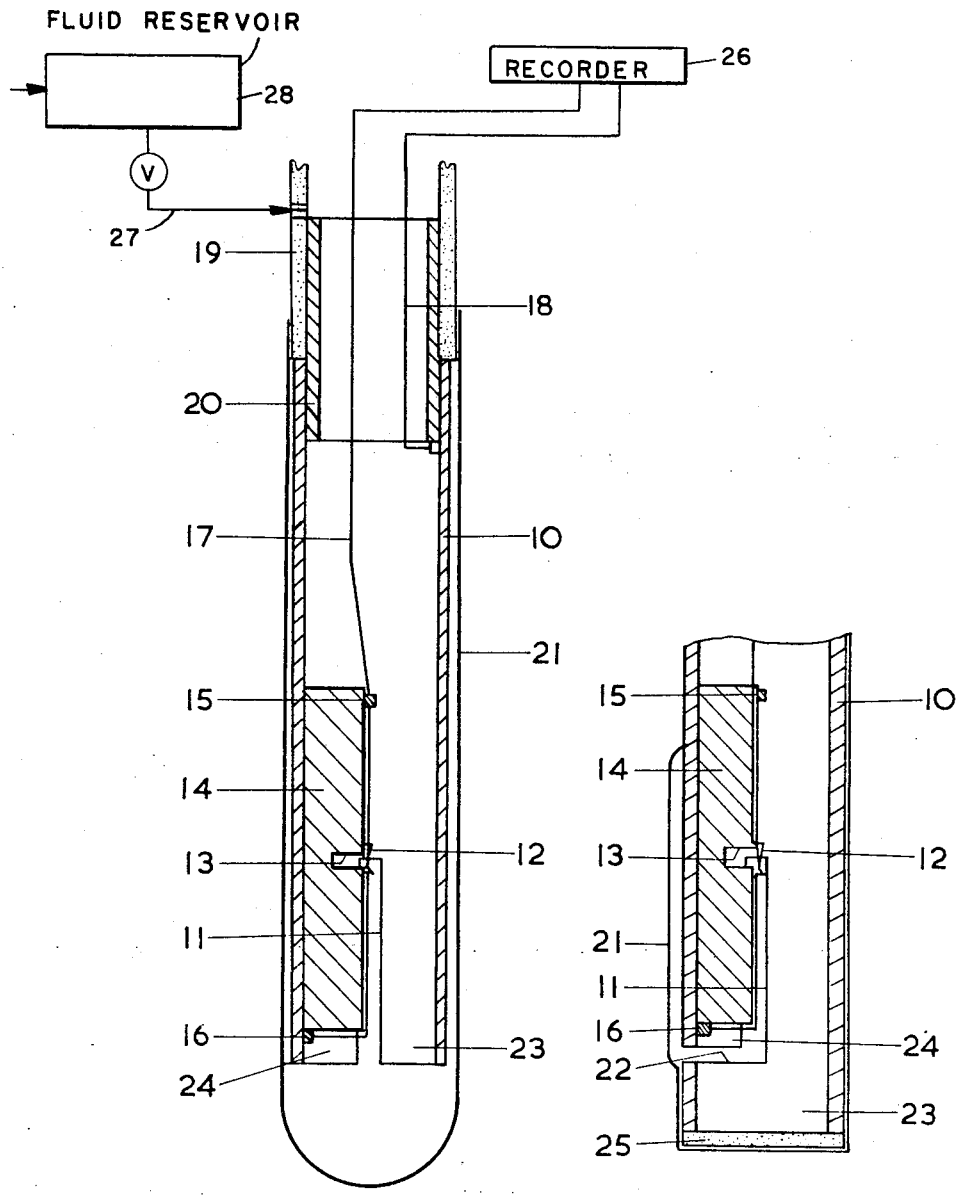
FIG. 1 shows an axial cross section of the embodiment.
FIG. 2 shows, in part, a modification of the embodiment of FIG. 1.

Referring to FIG. 1, the invention illustrated is in the form of a pressure transducer suitable for implantation in the heart of an animal and comprises a pressure sensitive device in the form of a pair of prongs 23 and 24 formed from a stainless steel tube 10, open at both ends, provided with two equal axial slots 11 extending from one end of the tube and located radially to each other. Mounted along the axis of the tube 10 is a detector in the form of a silicon crystal strain gauge composed of a silicon crystal 12 secured across a transverse slot 13 in a base formed from a rectangular parallelopipe 14 made of insulating material. The strain gauge is mounted within the tube 10 and along prong 24 so that the crystal 12 is located opposite the closed ends of the slots 11 and in the same plane as the slots 11. Electrical contact points 15 and 16, connected to opposite ends of the crystal 12, and secured respectively to a lead 17 and the tube 10 which, in turn, is secured to a second lead 18. The tube 10 is joined at its end remote from the slots 11 to a flexible tube 19 of the same internal diameter and preferably made of silicone rubber, by way of stainless steel tube 20 of external diameter equal to the internal diameter of the tubes 10 and 19 and which fits within both of the tubes 10 and 19. Surrounding the whole of the pressure sensitive device, i.e., tube 10 and its associated strain gauge, is a distendable envelope in the form of a balloon 21 made of flexible material, for example silicone rubber, which is secured to the external surface of the flexible tube 19. When the pressure on each surface of the balloon 21 is the same, the balloon 21 is not in contact with the tube 10. The tube 19 provides a conduit for the electrical leads 17 and 18 to a recorder (not shown), and this conduit together with the open ends of the tube 10 provides a fluid access means communicating with the interior of balloon 21 and with each side of prong 24.

An alternative, and particularly preferred, arrangement is illustrated in FIG. 2 in which the tube 10 is provided with an L-shaped slot composed of two equal axial slots 11 joined together at the end remote from the crystal 12 by a radial slot 22 to form a pair of prongs 23 and 24 as in FIG. 1. The balloon 21, instead of being separate from the tube 10 over its whole surface as shown in FIG. 1, is attached to the tube 10 over all its surface apart from that area across the end of the tube 10, which is attached to a plug 25 of silicone rubber, and the area adjacent to the prong 24 formed by the L-shaped slot in tube 10. Thus the balloon 21 forms an envelope only that part of which enclosing the prong 24 bearing the mounted strain gauge 12, is distendable. Clearly, instead of attaching a continuous balloon 21 to the tube 10, it is only necessary that the distendable portion or membrane should cover the area adjacent to the prong 24, and thus it is sufficient if the periphery of this area is attached to the tube 10, in which case, the remainder of the tube 10 may be considered as a rigid structure completing the envelope providing a closure which enables a difference in pressure to exist on each side of prong 24.

In operation, when the pressure transducer is to be used to measure the pressure of a body fluid in an animal, for example that of blood in the ventricle, the device is sterilized, implanted by surgery into the ventricle, and the flexible tube 19 is lead through the skin of the animal. The blood pressure on the external surface of the balloon 21, being greater than that on the internal surface which is atmospheric, presses the balloon 21 against the steel tube 10 and causes movement of the prongs 23 and 24 formed in the tube 10 in the form of flexure of these prongs about the closed ends of the slots 11 in response to the difference in pressure on each side of the prongs. This flexure is transmitted to the crystal 12 whose electrical resistance, in consequence, changes and the change is recorded by a recorder (not shown) connected to the leads 17 and 18 at the skin of the animal. Variations in the pressure on the external surface of the balloon 21 are recorded by variations in the flexure of the crystal 12 by way of variations in its electrical resistance.

When it is desired to determine the "zero pressure" reading of the recorder 26, a fluid, preferably a gas such as air or carbon dioxide is passed down the flexible tube 19 via valved line 27 connected to a fluid container 28 to raise the pressure inside the balloon and distend it until it is no longer in contract with the tube 10 at least along prong 24. This can be judged from the recorder which ceases to register variations in pressure external to the balloon 21. Clearly the necessary pressure is equal to, or greater than, that on the external surface of the balloon 21, and in this condition, the pressures on each side of the prongs formed in the tube 10 are equalized and so no flexure about the closed ends of the slots 11 occurs. The recorder thus registers "zero pressure." Reduction of the fluid pressure inside the balloon 11 to atmospheric enables the pressure transducer to record the external pressure on the balloon 21. The pressure at which the recorder first registers pressure corresponds to the external pressure on the balloon, and this can be used to provide a calibration point. The device may also be calibrated in position inside the animal by the usual method of reducing the pressure within the device by a known amount and determining the change in reading produced.

The particular form of distendable envelope, i.e., balloon 21, present in the embodiments described above is only one form of suitable envelope. Since the envelope need only be distendable over an area such that on being distended, the pressure sensitive device is rendered unresponsive to the external pressure, an alternative form of construction to that illustrated in FIG. 2 is a rigid frame provided with an aperture covered by a flexible material such that the flexible material may collapse on to a pressure sensitive device or be distended away from it. In this alternative, the flexible material may be replaced by a metal disc supported by a flexible annulus being made either of silicone rubber or metal, for example as in an aneroid barometer.

A further alternative construction which can be envisaged is a diaphragm, incorporating one or more strain gauges, supported by a rigid envelope and provided with a distendable portion or membrane over the diaphragm. Fluid access means would be provided to both sides of the diaphragm so that on passing a fluid into the device the pressure on each side of the diaphragm can be equalized and the membrane distended to render the device unresponsive to external pressure.

What we claim is:

1. A pressure transducer comprising:
   a pressure sensitive device including at least one part sensitive to a difference in pressure on each side of said part, and a detector for detecting strain induced in said sensitive part,
   an envelope providing a closure for said pressure sensitive device enabling a difference in pressure to exist on each side of said sensitive part included in said pressure sensitive device, and also including a distensible part located adjacent to, and unsecured to said pressure sensitive part, and fluid access means for permitting a supply of a fluid to the interior of said envelope and to each side of said sensitive part means for supplying fluid pressure to the interior of said pressure sensitive device at a pressure at least equal to that existing exteriorly of the distensible part, whereby the distensible part of the envelope is distended rendering the said pressure sensitive device unresponsive to the external pressure.

2. The pressure transducer of claim 1 wherein the pressure sensitive device comprises a pair of prongs which flex about a fixed point in response to a difference in pressure on each side of the prongs, and the detector is a strain gauge incorporating a silicon crystal.

3. The pressure transducer of claim 1 wherein the envelope comprises a balloon surrounding the pressure sensitive device.

4. The pressure transducer of claim 1 wherein the envelope comprises, in part, a rigid structure and, in part, a distendable membrane.

5. A method of determining the "zero pressure" reading of a pressure transducer having the features of the pressure transducer of claim 1, which comprises the steps of passing a fluid through the fluid access means thereby distending the distensible part of the envelope and rendering the pressure sensitive device unresponsive to any external pressure and equalizing the pressure on each side of the movable part included in the pressure sensitive device, and then reading the recorded pressure which represents the "zero pressure" reading.

6. The method of claim 5 wherein the fluid is a gas.

* * * * *